United States Patent [19]
Britten et al.

[11] 3,884,452
[45] May 20, 1975

[54] BLOW-MOLDING PLASTICIZING MANIFOLD

[75] Inventors: George C. Britten, Floral Park, N.Y.; Arion Mancuso, Ashland, Mass.

[73] Assignee: Manbritt Industries, Inc., Amityville, N.Y.

[22] Filed: Sept. 25, 1972

[21] Appl. No.: 291,651

[52] U.S. Cl. ............ 259/192; 259/6; 425/205
[51] Int. Cl. ............................. B29b 1/06
[58] Field of Search ........ 259/191, 192, 193, 6, 21, 259/40, 41, 97, 9, 10, 7; 425/209, 207, 208, 205

[56] References Cited
UNITED STATES PATENTS

| | | | |
|---|---|---|---|
| 2,639,464 | 5/1953 | Magerkurth | 259/191 |
| 3,261,056 | 7/1966 | Fritsch | 259/192 |
| 3,693,946 | 9/1972 | Merritt | 259/191 |
| 3,728,053 | 4/1973 | Stillhart | 259/191 |
| 3,746,315 | 7/1973 | Rizzi | 259/192 |

Primary Examiner—Robert W. Jenkins
Attorney, Agent, or Firm—Lilling & Siegel

[57] ABSTRACT

The present invention provides for the continued working or mastification of plastic material that has already been plasticized in a first assembly which comprises an extruder having a first screw and which thereafter is caused to pass to a distribution manifold, having a plurality of exit ports, or an elongated exit port as in a sheeting die, through which the plasticized material is injected or extruded. The invention comprises a manifold having an elongated exit port, or a plurality of exit ports, and a second or auxiliary screw for the continued working or mastification of the plasticized material while being distributed in the manifold for extrusion through the elongated exit port or during the time that the plurality of exit ports are closed or not being used and while the manifold is being filled with plasticized material to make same ready for injection or extrusion alternatively or intermittently through one or more of said plurality of exit ports.

22 Claims, 9 Drawing Figures

BLOW-MOLDING PLASTICIZING MANIFOLD

This invention relates generally to molding apparatus, and more specifically to a method and apparatus for use in molding hollow plastic containers.

Commercial methods of manufacturing hollow plastic containers are known which include what can broadly best be described as the two-step process of injecting a molten plastic resin into a blank or parison mold around a core pin to form a parison, and thereafter moving the core pin, together with the parison, into one or more hollow molds wherein fluid under pressure is admitted into the parison through the core pin to thereby expand the parison against the inner blow mold walls to form a predetermined and desired shape corresponding to that of the blow mold cavity. The blown molded article is thereafter ejected from the pin and mold.

The formation of plastic containers of polyolefins, polystyrene and other plastic resins by this method, and machinery to carry out the process are known to the art. However, many limitations and disadvantages of known molding apparatus continue to cause problems in the art of blow-molding. For example: Poor friction characteristics; inadequate plastification or plasticizing of the material to be molded; degradation of materials as a result of clogging or material "hang-ups," together with frequent equipment cleaning; defective molded products due to undesirable pressure drops due, in turn, to excessive friction in conveying material and/or non-uniform material temperatures, either of which often result in such hang-ups; - these are but a few problems presently experienced by those working with conventional blow-molding apparatus.

Solutions to these problems have historically resulted in rather complex, costly and unreliable machinery. Accordingly, it is an object of this invention to provide a method and apparatus for providing improved blow-molding of hollow plastic containers.

It is a further object of the invention to provide apparatus for improving the plastification or plasticizing of material to be blow-molded.

It is another object to provide apparatus for plastifying or plasticizing material over the substantially entire length of travel enroute to molding apparatus.

It is yet another object of the present invention to provide apparatus for creating a more fully worked and masticated homogeneous mix of material to be molded into hollow articles.

A further object of the invention is to provide a modular structure for use with molding apparatus which, when coupled with counterpart structures, enables the predetermined building of desired multi-port manifold lengths.

Yet another object is to provide apparatus for controlling the compression ratios of feeding material to blow molds.

Still a further object is to accomplish the aforementioned objects and to realize their benefits by providing improved apparatus which is relatively inexpensive, reliable, easy to maintain, and rather uncomplicated in structural makeup.

The present invention fulfills the aforementioned objects and overcomes the limitations and disadvantages of prior art solutions to problems associated with conventional equipment known to the art by providing, according to one aspect of the invention, a multi-port, screw-type, plasticizing manifold assembly for use either independently or with new and existing feed screw molding apparatus of the type having a flighted shaft. The manifold assembly includes an elongated housing for cooperative use with parison molds, for example, and being formed with a central chamber communicating with each of the ports. A shaft formed with helically extending flighting around the peripheral length is supported for both rotation and linear movement within the housing chamber for working and plasticizing material introduced into an inlet portion of the manifold housing. Coupling means are further provided for interconnecting and adding the manifold housing and flighted shaft to the barrel and shaft, respectively, of existing apparatus, thereby adding further plasticizing capabilities to the existing apparatus for working material being fed to blow molds. In a preferred embodiment of the invention, the flighted shafts of both the existing feed screw apparatus as well as that of said manifold assembly, are cooperatively coupled to a reciprocating slide assembly which, when actuated, serves to drive plasticized material under pressure through said ports, as better described below.

The invention will be more clearly understood from the following description of specific embodiments of the invention together with the accompanying drawings, wherein similar reference characters denote similar elements through the several views, and in which.

Before looking in more detail at the various views depicted in the drawings just described, it is worth mentioning here that the present invention to be described in more detail below is particularly applicable to the art of blow-molding plastic containers, preferably of hollow construction, by a process of injecting a molten plastic resin into a parison mold around a core pin to form a pairson, and thereafter moving the core pin together with the parison into one or more blow-molds wherein fluid such as compressed air or steam is introduced under pressure into the parison through the core pin to thereby expand the parison against the inner blow-mold walls to form a hollow article. Material used to comprise the substance of such hollow articles is fed to the molding apparatus via a material injection assembly, which includes a plasticizing portion capable of working a resin until it is in viscous fluid form suitable for injection.

Figures 1, 2:
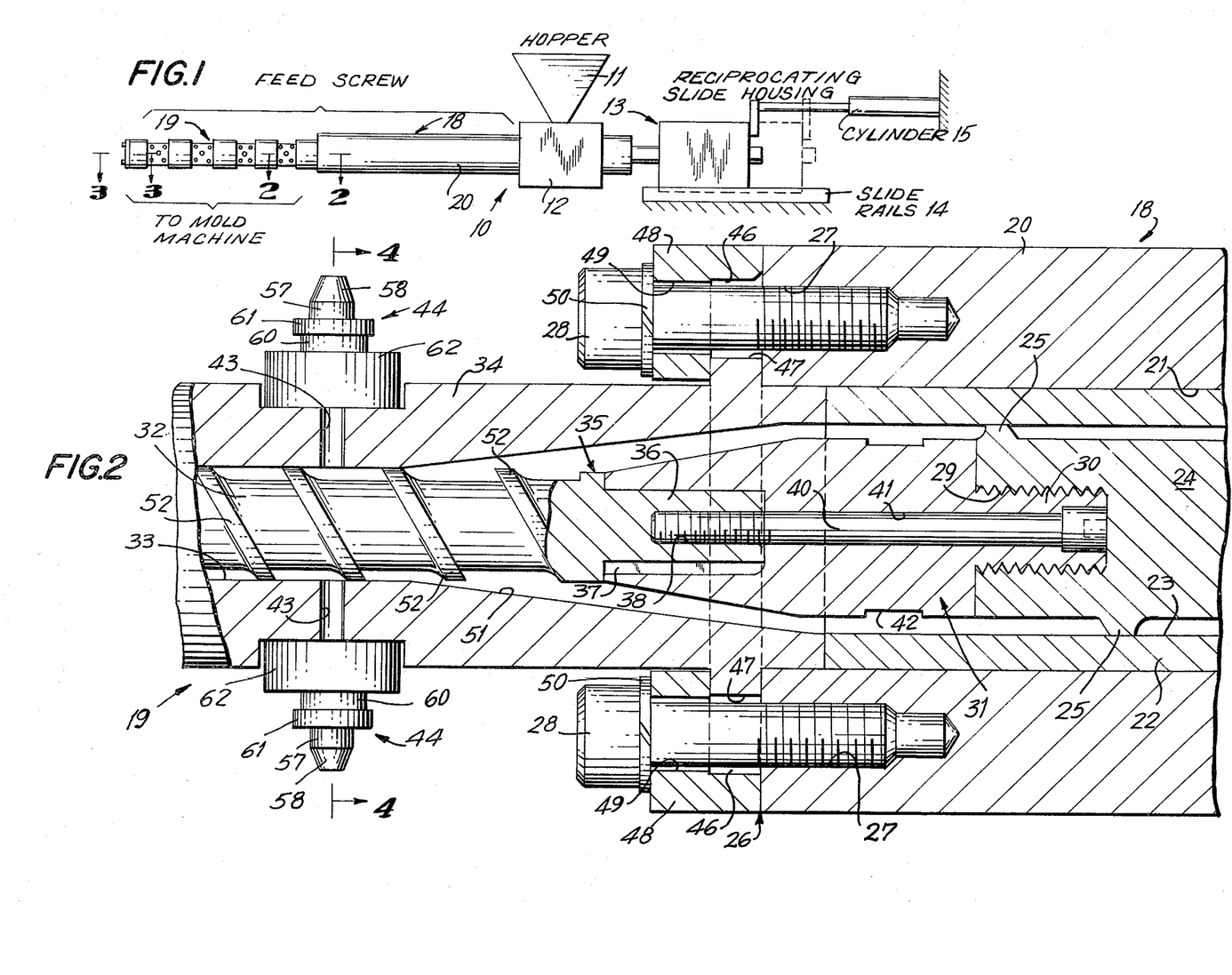
FIG. 1 is a schematic side elevational view of the feed portion of the molding apparatus, shown separate and apart from the molds associated therewith.
FIG. 2 is a fragmentary sectional plan view taken along line 2—2 of FIG. 1 and showing in more detail the construction of the present invention relating to the connection of a manifold shaft with an existing main feed shaft.

Referring now in more detail to the drawings, in FIG. 1 a molding apparatus is shown in schematic form and is characterized by reference numeral 10. Molding apparatus 10 constitutes various elements which include a hopper 11 situated immediately above a hopper housing 12 which, in turn, is axially aligned with a reciprocating slide bearing housing 13. Slide bearing housing 13 is supported for reciprocatory movement preferably upon substantially parallel slide rails 14 spaced from one another beneath bearing housing 13. A piston and cylinder assembly 15 is suitably supported such that the piston normally contacts and is coupled to a primary feed screw 24 (described below) supported for both rotation and reciprocatory movement within a primary feed screw assembly outer barrel 20. When the piston and cylinder assembly 15 is actuated, reciprocating slide housing 13 will be biased to the left as shown in FIG. 1 from the position schematically shown in phantom outline to that shown in solid lines. Actuation of piston and cylinder assembly 15 will cause primary feed screw 24 to move to the left, as best seen in FIG. 2. Piston and cylinder assembly 15 may be of the double-acting type such that, by proper valving, slide housing 13 is returned to its original position, or in the alternative forces acting upon primary feed screw 24 will cause assembly 15 to return.

Hopper 11 is situated above housing 12. Upon the introduction of bulk powdered plastic material such as for example, granular polyethylene into hopper 11, this bulk material will find its way by gravity into hopper housing 12 wherein it will come into contact with and be influenced by a primary screw feed assembly characterized by reference numeral 18 in FIG. 1. Also shown in FIG. 1 axially connected to primary feed screw assembly 18 is a multi-port manifold assembly 19 adapted to receive material from feed assembly 18.

Referring now to FIG. 2 of the drawings, it is seen that primary screw feed assembly 18 comprises an outer barrel 20 which is preferably an elongated hollow metallic cylinder formed with an elongated central cavity 21 therewithin. An inner barrel 22 is located within central cavity 21 in co-axial alignment with outer barrel 20 and is formed with an elongated primary plasticizing chamber 23 therewithin. It is contemplated by the present invention for outer barrels 20 to contain conventional heating elements surrounding primary plasticizing chamber 23 so as to impart heat to material within chamber 23.

A primary feed screw 24 is co-axially disposed within primary plasticizing chamber 23 and is formed with helically extending teeth or flighting 25 about its longitudinal periphery. Flighting 25 preferably engages the inner walls of inner barrel 22 defining primary plasticizing chamber 23 such that, when primary feed screw 24 is rotated in a clock-wise direction, material disposed between primary feed screw 24 and inner barrel 22 will be engaged by flighting 25 and will thereby be both worked or plasticized and conveyed toward manifold assembly 19.

Outer barrel 20 of primary screw feed assembly 18 is formed at its rearward end 26 with a plurality of threaded holes 27, each of which is formed with female threads. In the case where a manifold assembly 19 according to the present invention is not used, threaded holes 27 of feed assembly 18 may merely be used to accept the bolts associated with a cap or ported cover (not shown) or, for that matter, a conventional manifold (also not shown). In the case of the present invention, however, threaded holes 27 receive a comparable number of hexagonal headed retaining bolts 28 shown in FIG. 4 to be equally spaced along a predetermined bolt circle. Bolts 28 serve to unite manifold assembly 19 with primary screw feed assembly 18, as will later become apparent.

Primary feed screw 24 is formed in its rearward most end with a threaded opening 29 which, in turn, receives a male threaded protuberance 30 of a coupling assembly 31. Coupling assembly 31 functions to cooperatively interconnect primary feed screw 24 with a manifold feed screw 32 such that any movement imparted to primary feed screw 24 will thus be imparted to feed screw 32. Manifold feed screw 32 is centrally located within a manifold plasticizing chamber 33 formed in and defined by manifold housing 34, housing 34 and feed screw 32 comprising portions of manifold assembly 19. Manifold feed screw 32 is formed at its forward end 35 with a stepped portion 36 of lesser diameter. Stepped portion 36 defines both a key member 37 as well as a central threaded hole 38.

It can now be seen in FIG. 2 that a recess 39 formed in the rearward end of coupling assembly 31 accepts stepped portion 36 of manifold feed screw 32 in a keyed engagement, thereby interlocking both members such that there is no relative rotary movement therebetween. A rather slender socket head bolt 40 extends through a counter-bored opening 41 which, in turn, extends through coupling assembly 31. Bolt 40 holds manifold feed screw 32 and coupling assembly 31 integral with respect to one another. Flats 42 are formed in the outer surfaces of coupling assembly 31 to facilitate gripping same with a wrench or other suitable tool during assembly.

Manifold housing 34 is formed with a plurality of transverse exit ports 43 which communicate both with a tapered manifold plasticizing chamber 33 as well as with nozzle assembly 44. Nozzle assemblies 44 are preferably valved and serve to conduct fluid under pressure from manifold plasticizing chamber 33 through exit ports 43 and thereafter into a mold, shown schematically and fragmentarily in FIG. 4 and designated reference numeral 45. It should be noted here that the inner diameter of manifold plasticizing chamber 33 is less than that of primary plasticizing chamber 23, however, the present invention contemplates diameters of equal size. In the embodiment shown in FIG. 2, it should also be noted that while the coupling assembly 31 or transition piece between manifold feed screw 32 and primary feed screw 24 is unflighted, it is within the scope of the present invention to provide flighting within the tapered region upon the coupling assembly 31 or upon a tapered forward end portion of manifold feed screw 32, as may best be seen in FIG. 5.

Manifold housing 34 is better formed with an outwardly extending flange 46 adapted to abut rearward end 26 of outer barrel 20. Flange 46 is formed with a number of spaced holes corresponding to and in alignment with threaded holes 27, these holes being designated reference character 47 for convenience. A collar 48 comprises an angular ring similarly formed with holes 49 therethrough such that bolts 28 may be tightened against washers 50 while penetrating holes 49, 47 and 27, respectively.

The present invention contemplates two different modes of operation which give the user his choice of procedure. In a preferred embodiment illustrated in FIG. 1 which utilizes a reciprocating slide housing 13, it should be obvious from the drawings and the above description that material introduced through hopper 11 will find its way by gravity to the primary feed screw 24, which will normally be rotating. Feed screw 24 accepts this material and advances and works same while it is heated such that the worked material becomes what is described throughout this specification as plasticized. This plasticized material is conveyed through feed assembly 18 and, upon reaching coupling assembly 31, is thereafter conveyed through converging portion 51 of manifold plasticizing chamber 33 into engagement with flighting 52 associated with manifold feed screw 32. The plasticized material is thereafter further plasticized within manifold plasticizing chamber 33 while it is furter conveyed toward exit ports 43 whereupon the yet further plasticized material accumulates within leftmost portions of manifold assembly 19. Predetermined valving controls its flow through nozzle assemblies 44 to parison molds, in the case of the devices use with blow molding apparatus.

With valved nozzles 44 closed, the accumulating material within manifold assembly 19, builds up pressure and forces rotating manifold feed screw 32 to move under pressure to the right, as shown in FIG. 2, thereby returning reciprocating slide housing 13 to its initial position shown in phantom outline in FIG. 1. At a desired point of time in the cycle now being described, piston and cylinder assembly 15 is actuated, either automatically or manually, while at the same time a predetermined or desired number of nozzle assemblies 44 are opened by valving (not shown). The result is a ram-type movement of feed screws 24 and its coupled 32 to the left, as shown in FIG. 2, such that material accumulated in manifold plasticizing chamber 33 of manifold assembly 19 is driven or extruded out through nozzles 44 to parison molds, in the case of blow-molding. Whereupon, at this point in the cycle, the nozzles are valved closed and the operation repeats itself.

Movement of feed screws 24 and 32 to the right, in the case of the reciprocating embodiment now being described may also be accomplished independently of material pressure and still come within the scope of this invention. Of particular interest is the dual purpose of flighting 52 upon manifold feed screw 32. During rotation of feed screw 32, flighting 52 in its helical configuration serves to work and advance material, plasticizing same in the process. During linear movement of feed screw 32 to the left (FIG. 2.), flighting 52 serves as an extension of the cross-sectional area of shaft 32, giving the shaft a greater projected cross-sectional area, and thus a greater extrusion force capability due to the inherent incompressibility of most materials being plasticized with this apparatus.

While the above description of a preferred reciprocatory embodiment of this invention recites linear movement of feed screws 32 and 24, with manifold assembly 19 serving as a material accumulator, it is within the scope of the present invention to eliminate entirely the reciprocatory movement and to utilize the combination of assemblies 18 and 19 as extruders only. In this latter case, the rotation of feed screws 32 and 24 may be intermittent and even reversed, where desired. Of course, in this latter case, where T-type manifold assembly configurations are employed, as will be described in more detail below, it is preferred not to have a feed screw integral with the primary feed screw exhibit reciprocatory movement.

Figure 3:
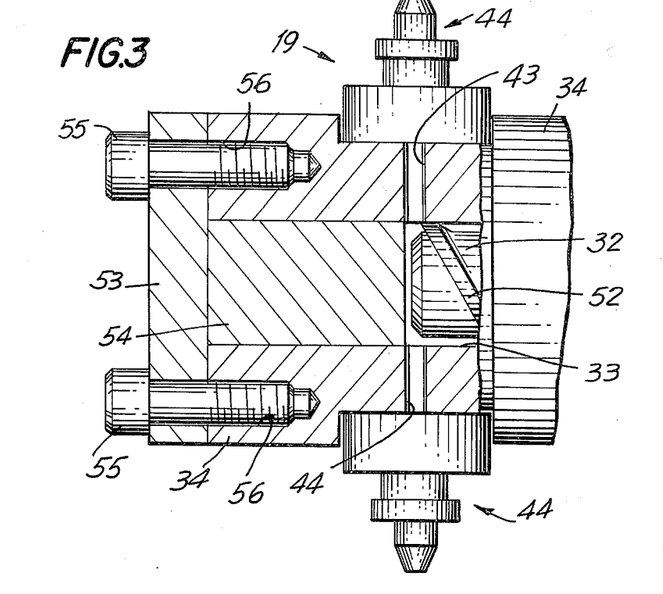
FIG. 3 is a fragmentary sectional view looking along line 3—3 of FIG. 1 and illustrating the disposition of the manifold screw shaft according to the present invention with respect to both an outermost extrusion nozzle as well as the end of the manifold.

FIG. 3 illustrates in more detail than FIG. 1 the preferred apparatus utilized to terminate multi-port manifold assembly 19. An end plate 53 together with a central plug member 54 are both utilized to seal off manifold plasticizing chamber 33 such that plasticized material will not escape from manifold housing 34. A plurality of bolts 55 extend through end plate 53 and into threaded engagement with threaded holes 56 formed through the end of manifold housing 34.

It may now be obvious that it is contemplated and within the scope of the present invention to provide more than one of the modular multi-port manifold assemblies of the type just described, which are suitable for interconnection with respect to one another such that their respective axial lengths can be enlarged or diminished, depending upon the choice or desire of the user, to facilitate the use of a variable number of exit ports and their associated nozzles 44. In this way, any number of parison molds can be accommodated with the present apparatus, while in each case, material fed to such parison molds is consistently plasticized enroute to the molds in a way which virtually eliminates poor friction characteristics, inadequate plastification of the material, degradation of the material, clogging or hang-up and any resulting defective molded products due to these undesirable elements.

Figure 4:
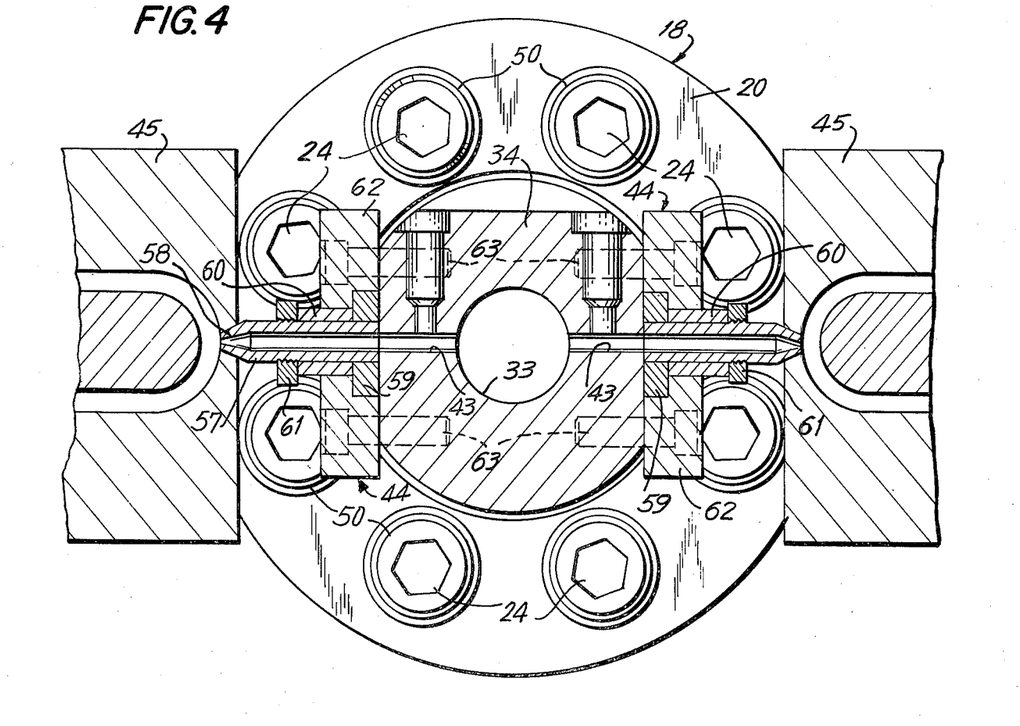
FIG. 4 is a fragmentary sectional view looking along line 4—4 of FIG. 2 and illustrating the structural make-up of the nozzle portion of the present invention.

The structural make-up of nozzle assemblies 44 can best be seen in FIG. 4 wherein a hollow pin member 57 extends in alignment with exit port 43 to its tapered tip 58. Washer 59 and spacer tube 60 are held together by threaded nut 61 which, in turn, engages external threads formed in pin member 57. A stepped collar 62 is bolted by bolt 63 to manifold housing 34 in a preferred embodiment of this invention.

The remaining FIGS. 5 – 8 further illustrate alternate embodiments contemplated by the present invention which yet exhibit the improved plasticizing characteristics described above.

Figure 5:
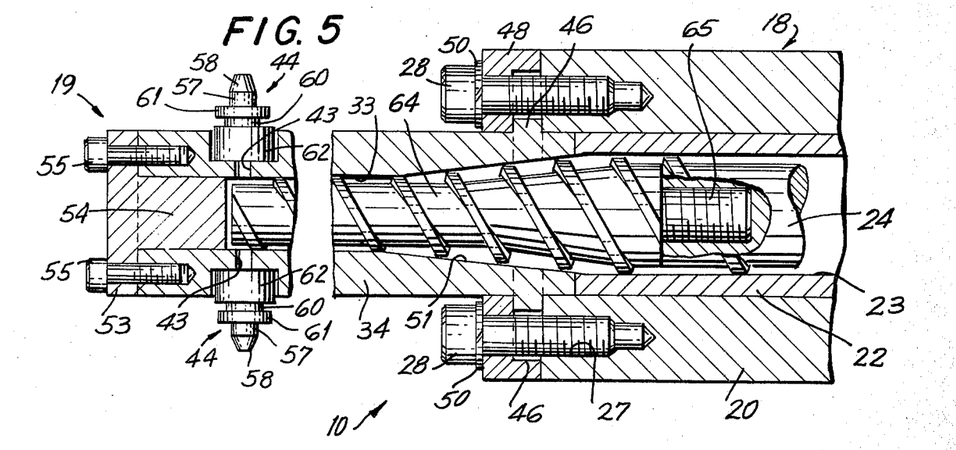
FIG. 5 is a fragmentary sectional view of a manifold assembly according to the present invention wherein a tapered flighted shaft is utilized.

FIG. 5 illustrates an embodiment of the invention very similar to that already described for FIGS. 1 – 4, but including a continuous tapered manifold feed screw 64 which replaces manifold feed screw 32. For purposes of convenience and brevity, the remaining elements of multi-port manifold assembly 19 shown in FIG. 5 are labeled with the reference numerals used to describe the assembly of FIGS. 2 and 4. In this regard it is within the scope of this invention to replace the coupling assembly 31 and the manifold feed screw 32 with flighted feed screw 64. A threaded protuberance 65 internally formed with feed screw 64 and possessing the same pitch and diameter as protuberance 30 will easily enter and matingly engage threaded hole 29 within primary feed screw 24.

Figures 6, 7, 9:
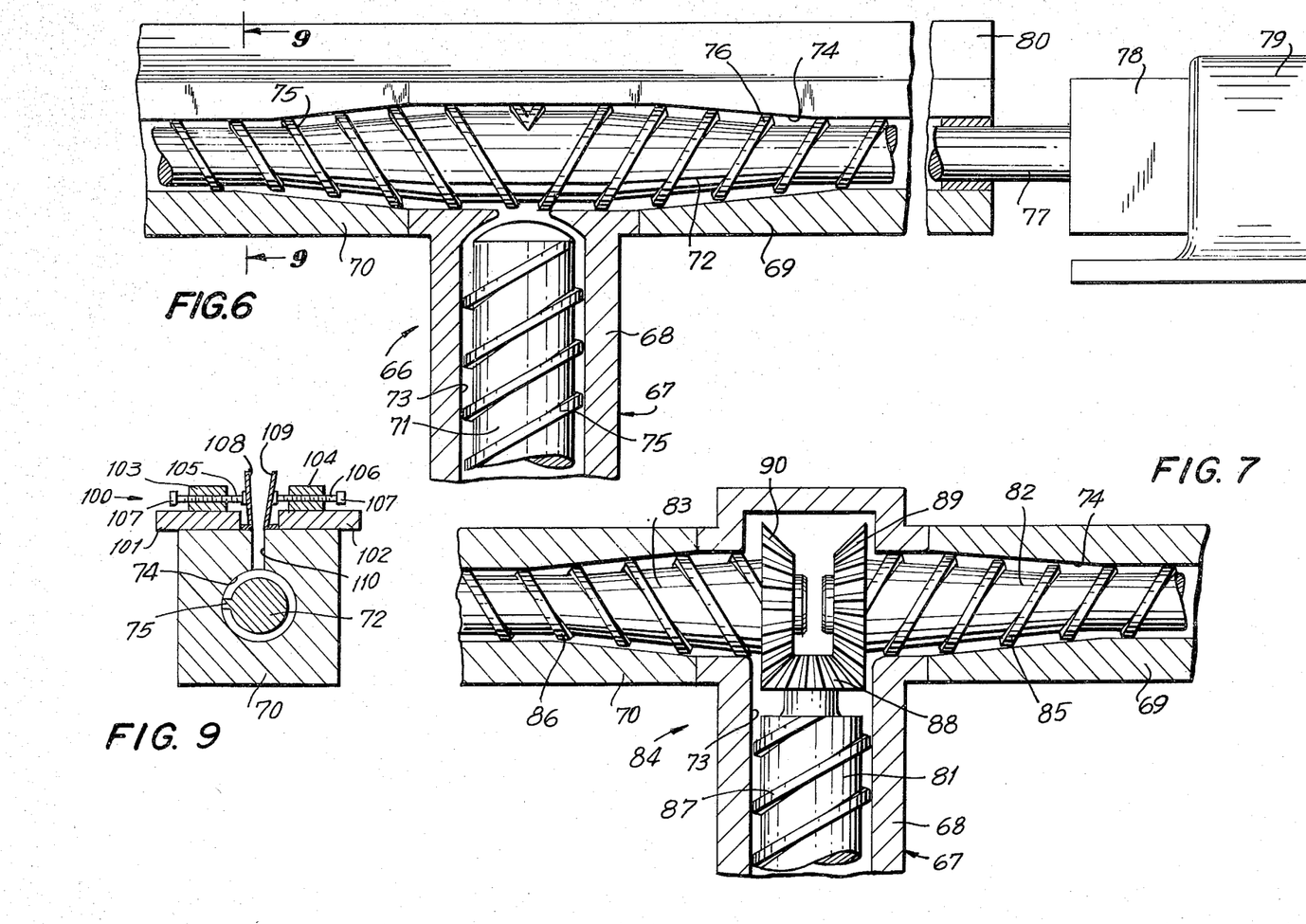
FIG. 6 is a fragmentary sectional plan view illustrating another embodiment of the present invention wherein a T-shaped manifold assembly is utilized.
FIG. 7 is a fragmentary sectional plan view of yet another embodiment of the present invention illustrating a T-shaped manifold assembly of the type described for FIG. 6.
FIG. 9 is a sectional elevational view of a preferred nozzle configuration according to the present invention, looking along the line 9—9 of FIG. 6.

FIG. 6 illustrates what will hereinafter be referred to as a T-type embodiment of this invention, for want of a better description, wherein the overall shape of a multi-port manifold assembly 66 approximates that letter of the alphabet. Manifold assembly 66 includes a housing 67 comprising three basic segments 68, 69 and 70 capable of interfitting together to form the shape best shown in FIG. 6. Flighted shafts or manifold feed screws 71 and 72 are supported for rotary movement within manifold plasticizing chambers 73 and 74, respectively. Manifold feed screw 71 is formed with helically extending flighting 75, in much the same manner as that described for flighting 52 on feed screw 32, such that upon counter-clockwise rotation of feed screw 71, material within manifold plasticizing chamber 73 will be further worked or plasticized while simultaneously being conveyed toward chamber 74.

Manifold feed screw 72, unlike feed screw 71, is formed with both left and right-handed helically extending flighting 75 and 76 which, when rotated by means of shaft 77 secured thereto, will cause a yet further working or plastification of material within chamber 74 while simultaneously distributing or conveying same away from the point of intersection of chambers 73 and 74, toward the outer extremities of manifold feed screw 72. Shaft 77 is preferably powered by a conventional motor 79 through a gear box 78.

Manifold assembly 66 is particularly well adapted for use with a sheeting die, shown fragmentarily in FIG. 6 and referenced by character 80. Thus, material forced under pressure into chamber 74 will exit this chamber through an elongated slot formed in housing segments 69 and 70 (not shown) and will thereafter flow into sheeting die 80.

Figure 8:
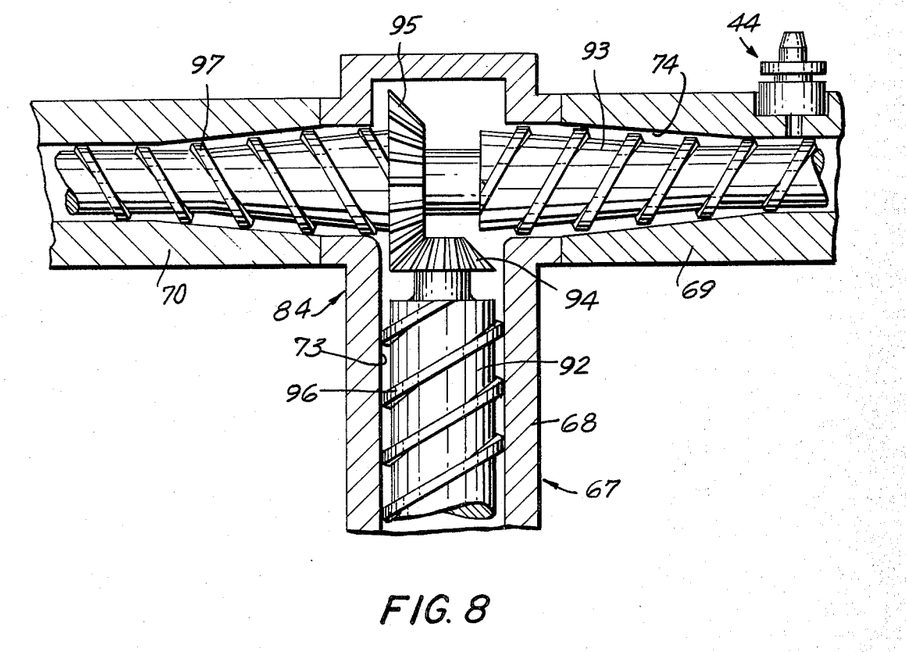
FIG. 8 is a fragmentary sectional plan view of a still further embodiment of the present invention wherein yet another T-shaped manifold assembly is illustrated.

Both FIG. 7 and FIG. 8 illustrate alternate means by which one of two manifold feed screws drives the other within a T-shaped, multi-port manifold assembly of the type already described in FIG. 6 and designated reference numeral 66. In both instances to be described now below, an advantage resides in an ability to eliminate the need for a motor to separately drive either of the two manifold feed screws. Of course, this advantage is affected by the obvious inability to separately and independently control the rotary speed of this feed screw, such as is enabled in the embodiment of the invention shown in FIG. 6.

Looking now at FIG. 7, three manifold feed screws, 81, 82 and 83 are disposed within manifold plasticizing chambers 73 and 74 to form assembly 84. Feed screws 82 and 83 are tapered at their most adjacent ends and are each formed with helically extending flighting 85 and 86, respectively. Feed screw 81 is similarly formed with flighting 87. Matingly engaging bevel gears 88, 89 and 90 are integrally secured to the adjacent and cooperative ends of manifold feed screws 81, 82 and 83, respectively. Rotary motion imparted to manifold feed screw 81 will thus impart rotary motion to each of feed screws 82 and 83 via this gearing, thereby facilitating the plasticizing and distribution of material already described.

Manifold assembly 91, shown in FIG. 8, like assembly 84 illustrated in FIG. 7, utilizes gearing between two manifold feed screws 92 and 93. Bevel gears 94 and 95 are integrally secured to feed screws 92 and 93 such that they matingly and cooperatively engage one another during operation. This embodiment is an alternative method of accomplishing the functioning of the manifold assembly 84, however, with one single feed screw 93 replacing feed screws 82 and 83. Feed screws 92 and 93 are formed with flighting 96 and 97, respectively, as in the previously described embodiments.

While the present invention has been described with reference to specific embodiments illustrated in the figures of the drawings heretofore described, embodiments and changes coming within the scope of the present invention may occur to those skilled in the art and, as such, are contemplated by this invention. Various changes and modifications may be made by those skilled in the art without departing from the scope of the invention defined by the proper scope of the appended claims.

While the attached drawings described above illustrate a manifold feed screw of a lesser diameter than the primary feed screw, it should be appreciated and it is contemplated by this invention that a single continuous screw of uniform diameter extends from the primary screw feed assembly through the multiport manifold assembly. The manifold feed screw may have a different compression ratio than the primary screw feed assembly. For example, the manifold assembly 19 described for FIG. 2 may have a compression ratio as low as 1.5, with the compression ratio in the primary screw feed assembly being 4.5, by conducting the plasticized material into the manifold assembly 19 at lower compression ratio. This will facilitate less degradation of what can be termed "exotic" materials, including materials marketed by Vistron as Barax; poly vinyl chloride; and XT material marketed by American Cyanamid Company.

It is further within the scope of the present invention to vary the flighting, whether it be opposed flighting in the case of the T-shaped structures described or the single helical flighting described, such that the relative pitch and diameter of this flighting can accomplish different plastification or plasticizing characteristics conveying characteristics and/or predetermined compression ratio characteristics. With the present invention the length of the effective combination feed screw resulting in the novel structural combination described is materially increased to yield far better plasticizing characteristics than heretofore known to the art. The complete working of the material over its entire distance of travel prior to its being marketed accomplishes a substantial reduction, if not an elimination, of the problems known to the art and sought by this invention to overcome. More uniform pressures throughout the molding system enable uniform quality in the finished marketed articles. Uniform temperatures are accomplished via the superior mixing and plasticizing characteristics exhibited by the present invention. By a reversal of the direction of rotation of a feed screw described according to the present invention, such-back can be accomplished which will stop the injection nozzle forming part of this structure from drooling.

FIG. 9 illustrates a preferred embodiment of a nozzle assembly capable of use in regulating the flow of material from manifold plasticizing chamber 74 to sheeting die 80, best shown in FIG. 6. Nozzle assembly 100 comprises two support blocks 101 and 102 which are, respectively supported by and secured to housing segment 69. Members 103 and 104 are disposed atop and integral with support blocks 101 and 102, respectively, and are each formed with internal threads adapted to receive adjustable rods 105 and 106, respectively. Rods 105 and 106 are each formed with a knurled adjustment knob 107 at remote ends thereof, while their respective inner or juxtaposed ends terminate with die plates 108 and 109.

Die plates 108 and 109 provide a continuation of the exit slot 110 extending from manifold plasticizing chamber 74, such that by manipulation of adjustment knobs 107 of rods 105 and 106, the proximity of plates 108 and 109 with respect to one another may be altered, thereby regulating and controlling the thickness of material exiting from slot 110. Of course, other forms and modifications of the adjustable assembly 100 just described are contemplated by this invention.

What is claimed is:

1. A manifold assembly for use in combination with an extruder having first screw means for the plastification of thermoplastic material, the manifold assembly comprising: an elongated distribution manifold having a longitudinally extending internal passageway circular in any cross-section of working area and a plurality of exit ports extending transverse to the axis of the manifold; second screw means mounted for rotation axially and centrally of the passageway in said manifold; and, drive means for rotating said second screw means; whereby the thermoplastic material which is plasticized by said first screw means of said extruder will be continuously masticated while being distributed through said distribution manifold until such time as said material is injected or extruded through one or more of said exit ports.

2. The apparatus according to claim 1, wherein the drive means for said second screw means comprises the drive means for the said first screw means of said extruder.

3. The apparatus according to claim 1, wherein said manifold is mounted so that the longitudinal axis thereof is perpendicular to the longitudinal axis of said first screw means.

4. The apparatus according to claim 3, wherein the said longitudinal axes of said manifold and said first screw means are substantially in the same plane.

5. The apparatus according to claim 4, wherein the drive means for said second screw means comprises an independent drive operatively connected to said second screw means at one end of said manifold.

6. Molding apparatus, comprising, in combination, a first assembly including first means for accepting material and plasticizing same while simultaneously conveying said material toward a second assembly, and a second assembly co-operatively connected to said first assembly including second means for accepting plasticized material from said first means and further plasticizing same while simultaneously conveying same to an exit port, said second assembly including a manifold having a plurality of exit ports and being further formed with a chamber therewithin communicating with said exit ports, a portion of said second means being movably disposed within said chamber; and each of said exit ports co-operatively communicating with a valved nozzle assembly.

7. Molding apparatus, comprising, in combination, a first assembly including first means for accepting material and plasticizing same while simultaneously conveying said material toward a second assembly, and a second assembly co-operatively connected to said first assembly including second means for accepting plasticized material from said first means and further plasticizing same while simultaneously conveying same to an exit port; said second means comprising an elongated shaft member formed with outer peripheral portions thereof forming a helically extending protuberance extending in a substantially helical path along a portion of its length; said second assembly including a manifold defining at least one such exit port and being further formed with a chamber therewithin communicating with said exit port, a portion of said second means being movably disposed within said chamber; and said shaft is formed with a stepped end portion of lesser diameter defining an opening formed with female threads, and said stepped end portion further including a key portion integral therewith.

8. Molding apparatus, according to claim 7, further including a transition member disposed intermediate said shaft and said first assembly, said transition member being formed with a grooved opening for receiving said stepped end portion of said shaft.

9. Molding apparatus, comprising, in combination, a first assembly including first means for accepting material and plasticizing same while simultaneously conveying said material toward a second assembly, and a second assembly co-operatively connected to said first assembly including second means for accepting plasticized material from said first means and further plasticizing same while simultaneously conveying same to an exit port; said second means comprising an elongated shaft member formed with outer peripheral portions thereof forming a helically extending protuberance extending in a substantially helical path along a portion of its length; said second assembly including a manifold defining at least one such exit port and being further formed with a chamber therewithin communicating with said exit port, a portion of said second means being movably disposed within said chamber; said elongated shaft member comprising a first shaft which includes a remote end portion defining a first bevel gear, said second assembly further including a second shaft disposed at an angle with respect to the axis of said first shaft and formed with a second bevel gear co-operatively engaging said first gear such that rotation of said first shaft results in rotation of said second shaft.

10. Molding apparatus, according to claim 9, wherein the axes of said first and second shafts extend substantially perpendicularly with respect to one another.

11. Molding apparatus, according to claim 10, wherein said second assembly further comprises a second barrel integral with said manifold and defining a cavity communicating with said chamber within which said second shaft is disposed, said second barrel further defining exit ports communicating with said cavity, said second shaft further working plasticized material previously worked by said first shaft.

12. An adapter assembly for use with existing plastic molding apparatus having a plasticizing structure for working material comprising, in combination, a housing formed with a chamber therewithin, said housing being further formed with at least one port communicating with said chamber, plasticizing means co-operatively connected to said plasticizing structure for further working said material while simultaneously conveying same to said port, said plasticizing means comprising a member movably disposed within said chamber, said member being formed with portions thereof disposed adjacent said port, and connection means for interconnecting said member to said plasticizing structure.

13. A multi-port plasticizing manifold for use with existing plastic molding apparatus, said apparatus comprising a first flighted shaft movable within an existing elongated barrel for working material prior to its being molded into a predetermined parison shape, the improvement comprising a second elongated housing formed with a chamber therewithin, said elongated housing being further formed with a plurality of openings defining exit ports adapted to convey said material to a mold, each of said ports communicating with said chamber, a second flighted shaft rotatably disposed within said housing, and connection means cooperatively interconnecting said second flighted shaft with said first flighted shaft for enabling additional working of said material between said existing apparatus and each of said exit ports.

14. A manifold assembly for use in combination with an extruder having first screw means for the plastification of thermoplastic material, the manifold assembly comprising: an elongated distribution manifold having a longitudinally extending internal passageway circular in any cross-section of working area and a plurality of exit ports; second screw means, axially in line with said first screw means, mounted for rotation axially and centrally of the passageway in said manifold; and, drive means for rotating said second screw means; whereby the thermoplastic material which is plasticized by said first screw means of said extruder will be continuously masticated while being distributed through said distribution manifold until such time as said material is injected or extruded through one or more of said exit ports.

15. The apparatus according to claim 14, including a transition element between said first and second screws.

16. The apparatus according to claim 15, wherein said transition element is tapered and said second screw is smaller in diameter than said first screw.

17. The apparatus according to claim 14, wherein said second screw means is tapered along a portion thereof adjacent to said first screw means; and said second screw means and said tapered portion form an integral member having a single continuous thread.

18. The apparatus according to claim 14, further including means for reciprocating said first screw means of said extruder along its longitudinal axis.

19. A manifold assembly for use in combination with an extruder having first screw means for the plastification of thermoplastic material, the manifold assembly comprising: an elongated distribution manifold having a longitudinally extending internal passageway circular in any cross-section of working area and a plurality of exit ports and being mounted so that the longitudinal axis thereof is perpendicular to the longitudinal axis of said first screw means and substantially in the same plane thereof; second screw means mounted for rotation axially and centrally of the passageway in said manifold; and, drive means for rotating said first screw means including connecting means between said first and second screw means for rotating said second screw means; whereby the thermoplastic material which is plasticized by said first screw means of said extruder will be continuously masticated while being distributed through said distribution manifold until such time as the material is injected or extruded through one or more of said exit ports.

20. The apparatus according to claim 19, wherein said second screw means comprises a screw having threaded portions extending in opposite directions from said connecting means and centrally of said manifold passageway.

21. The apparatus according to claim 20, wherein said connecting means comprises at least one pair of bevelled gears.

22. The apparatus according to claim 19, wherein said second screw means comprises a pair of axially aligned screws extending in opposite directions centrally of said manifold passageway, and wherein said connecting means comprises a first bevelled gear at the remote end of said first screw means and second and third bevelled gears at one end of each of said pair of screws interconnecting at the juncture thereof with said first bevelled gear.

* * * * *